United States Patent [19]

Weihrauch

[11] Patent Number: 4,892,698

[45] Date of Patent: Jan. 9, 1990

[54] METHOD FOR MANUFACTURING PRODUCTS WITH BRISTLES

[75] Inventor: Georg Weihrauch, Waldmichelbach, Fed. Rep. of Germany

[73] Assignee: Coronet-Werke Heinrich Schlerf GmbH, Waldmichelbach, Fed. Rep. of Germany

[21] Appl. No.: 845,342

[22] Filed: Mar. 28, 1986

[30] Foreign Application Priority Data

Mar. 29, 1985 [DE] Fed. Rep. of Germany ....... 3511528

[51] Int. Cl.$^4$ ............................................. B29D 31/00
[52] U.S. Cl. .................................. 264/243; 264/46.4; 264/275; 300/21
[58] Field of Search .............. 264/243, 275, 278, 46.4; 300/21

[56] References Cited

U.S. PATENT DOCUMENTS

| 4,106,745 | 8/1978 | Carrow | 264/275 |
| 4,352,772 | 10/1982 | Bezner | 264/275 |
| 4,545,087 | 10/1985 | Nahum | 15/22 R |
| 4,609,228 | 9/1986 | Bickel | 264/243 |
| 4,635,313 | 1/1987 | Fassler et al. | 264/243 |

FOREIGN PATENT DOCUMENTS 7115606 5/1972 Netherlands ...................... 264/243

Primary Examiner—Jeffery Thurlow
Assistant Examiner—Allan R. Kuhns
Attorney, Agent, or Firm—Antonelli, Terry & Wands

[57] ABSTRACT

A method for manufacturing products with bristles, composed of a bristle holder made of pourable or foamable material and plastic bristles anchored therein. The bristles are introduced through channels into a mold for the bristle holder, melted by heat at the end in the mold to form a thickening, and the thickening of each bristle is brought into a sealing fit with the opening of the channel guiding it, possibly leaving an undercut at the thickening, and the mold is then filled with bristle holder material. The bristles and bristle holders can be made from different materials by casting or foaming of the bristle holder, whereby the channels guiding the bristles are sealed off by the thickening so that the bristle holder material cannot escape to the outside and especially cannot have a disadvantageous effect on the bristle shoulder. In addition, a combined force and force-fitted anchoring of the bristles in the bristle holder is ensured.

12 Claims, 1 Drawing Sheet

METHOD FOR MANUFACTURING PRODUCTS WITH BRISTLES

BACKGROUND OF THE INVENTION

The present invention relates to a method for manufacturing products with bristles, with the products including a bristle holder made of pourable or foamable material, and bristles anchored therein, made of plastic, wherein the bristles, individual bristles or strands of bristles, are introduced through channels into a mold for the bristle holder and melted by heat at the end which is in the mold to form a thickening, after which the mold is filled with the bristle holder material.

The conventional technology for manufacturing products with bristles, such as brushes, brooms, mats, or the like, includes wrapping the bristles, possibly from an endless strand, compressing the bristles, cutting the bristles to length, and then mechanically fastening each tuft, possibly with the aid of putty or glue, in preformed holes in the bristle holder. Therefore the manufacturing method includes at least three steps, namely manufacturing the bristle tuft, making the bristle holder, and combining the bristle tuft and bristle holder. Since the discovery of plastics, many attempts have been made to simplify this costly procedure for the manufacturing process by using the thermoplastic behavior of such plastics. Thus it was proposed in, for example, German Patent 355,645 to introduce the bristles by their fastening ends into a hollow mold for the bristle holder, and then fill the hollow mold with a material that was plastic when heated. After this material hardened, the bristles would be anchored in the bristle holder. In this proposed method, there is only a very poor bond if any between the smooth walled bristles and the bristle holder material, so that the adhesive forces between bristles and bristle holder bristles sufficient resistance to pulling out. And, consequently, this method therefore could not be put to practical use.

The above proposed method was again tried in, for example, German Patent 895 140 and modified with a knowledge of the above-mentioned disadvantage by using the same materials for the bristles and the bristle holder, namely polyamides or polyurethanes, in order to obtain a form of thermal melting between the two materials at the elevated processing temperature. However this approach only permits making products with bristles that have the material-specific properties of the particular materials used, and which once again are suitable only for very special applications. Here too, the specially proposed materials are relatively costly plastics which would result in an unacceptable increase in price for many products with bristles.

Bristle holders today are generally made by the injection molding process so that this can also be used to working in the above-mentioned method. Here, however, problems have arisen because the liquid material injected into the mold penetrates between the bristles and between the bristles and channels guiding them and results after hardening in an undesirably irregular sealing surface on the bristle holder on the bristle side. In addition the bristle tuft loses its elasticity in the vicinity of its point of contact with the bristle holder so that, since this penetration does not occur uniformly, the individual bristle tufts under certain conditions might exhibit different bending behavior. Subsequent cleaning of the contact points, if at all possible can be carried out only at a considerable expense.

In order to improve the bonding of the bristles in the bristle holder, it is proposed in German Patent 845 933 to melt and possibly to shape the bristle ends extending into the mold chamber so that each bristle tuft has at its end a thickening which is greater than its diameter, with the thickening being disposed at a distance from one wall of the mold. After the bristle ends are coated by injection or foaming, they are anchored positively and firmly in the bristle holder, resulting in a sufficient resistance to pulling out. The problem of the escape of the bristle holder material into the guide channels for the bristle strands is however not solved. Therefore, there have been many attempts such as proposed in German OS 29 22 877 to seal off the guide channel for each bristle tuft, whereby, for example, the injection-molding material is initially injected at low pressure against one mold wall and prehardened, and only then is the greater part of the injection-molding material introduced into the mold. This method is extraordinarily expensive if it is desired to have a flawless sealing surface on the bristle holder. In addition, an intensive cooling of the channels has been proposed which is impossible in practice with the bristle tufts so close together. In addition, the proposal to generate a counterpressure against the injection-molding pressure in the guide channels is not practical since this counterpressure would again result in an irregular sealing surface on the bristle holder. The same is true for a sealing of the openings of the guide channels caused by the injection-molding process, with the channels being opened after the pressure in the mold drops, in order then to press the bristle strands into the still soft plastic material. Here in every case the adhesion between the bristles and the bristle holder material is disadvantageously influenced. Finally, mechanical seals in the vicinity of the guide channels produced, for example, by conical tapering of the opening or sealing lips disposed at this point offer no solution to the problem since the bristles cannot be packed together densely enough to prevent capillary-like spaces from being left between them. This is especially true of shaped bristles and hollow bristles. The variation in diameter which occur with bristles of any kind and the cross-sectional shape which is usually other than circular, produce large gaps in a tuft.

Recognizing these problems, a new technology is aimed at manufacturing the bristle holder and the bristles in a single injection-molding process, whereby injection-molding tool comprise a corresponding hollow mold for the bristle holders and bristles. Here it is disadvantageous for the plastic bristles to retain their bending ability and their restraightening ability, although their strength is obtained primarily by stretching the bristle material. An injection-molded bristle does not exhibit these properties; therefore, in the case of bristles that are injected integrally such as in, for example, German OS 21 55 888 and U.S. Pat. No. 23 55 744, the bristles must be stretched after the injection-molding process. This assumes that complex tools and corresponding gripping means must be provided on the bristles in order to apply the tensile forces to the individual bristles. In addition, bristle tufts cannot be stabilized in practice in this fashion. For fine bristles, for example, toothbrushes, clothes brushes, or the like, this method is completely unacceptable. In addition in the case of bristles and bristle holders made of the same material it is assumed that their selection is determined primarily by the higher requirements imposed on the bristle material.

- The aim the invention resides in providing a method by which bristles and bristle holders can be made out of any pourable or foamable material, possibly even out of different materials and an absolutely clean seal is obtained at the point where the bristle tuft joins the bristle holder.

In accordance with the method of the present invention the bristles are melted by heat at the end that projects into the mold to form a thickening, with the aim being achieved according to the invention by virtue of the fact that the thickening is brought into a sealing application or contact with the opening of the channel guiding them by tensil forces applied to the bristles.

Therefore, the invention is based first of all on the known fact that the application of thickenings to the ends of bristles produces a reliable anchoring of bristles in the bristle holder, with the bristle tuft being held in the bristle holder by a combination of force and force-fitting. The escape of the plastic material of the bristle holder from the hollow mold into the guide channels is reliably avoided by virtue of the fact that the opening of each guide channel is positively sealed by the thickening at the end of the bristle which it guides, whereby an undercut can be left between the thickening and the mold wall, into which the plastic material of the bristle holder can penetrate in order additionally to improve the desired anchoring. The thickening can be shaped so that it seals off the opening edge only along a line, thus producing an especially good seal. This can readily be achived by virtue of the fact that the surface of the thickening that faces the bristles is curved. Such curvature occurs during the thermal melting of bristle ends as a rule merely because the bristles contract when melted and the plastic expands laterally to form a spherical or pearl shape. This effect automatically occurs as the result of the stretching of the bristles. Instead, however, the thickening can be so shaped at the back that it corresponds to a corresponding outline in the vicinity of the opening of the guide channel in order for example to form longer sealing gaps or the like.

The method according to the invention can be used with any desirable combination of materials, especially materials with different melting points, so that the products with bristles manufactured in this manner can be optimized as desired in terms of their application, their technological requirements, and their price structure. The thickening also provides a reliable seal for individual bristles that have cross-sectional shapes that are noncircular, as well as for shaped or hollow bristles, either individually or in tufts.

Several embodiments are possible for the practical implementation of the principle according to the invention. Thus, for example, the thickening can be brought into the sealing position before the bristle holder material penetrates the mold. This can be accomplished for example by pressing the thickening against the opening of the guide channel by using tensile forces applied to the bristles acting on the thickening, in a mechanical fashion; most simply it can be accomplished by the bristles being pulled back into the guide channel after the thickening is formed or by the corresponding half of the mold being pushed against the thickening until the thickening abuts the opening.

Instead, however, it is also possible to bring the thickening into the sealing position when it is produced, with the projection of the bristle strand in the hollow mold and the melting process being chosen so that the melted thickening practically speaking shrinks down to the edge of the opening of the guide channel.

In another version, the thickening is brought into the sealing position during the introduction of the bristle holder material, whereby the thickening, disposed at a short distance from the wall of the mold, with the pressure which develops when the mold is filled, the thickening, like a piston is forced back into the guide channel so that it abuts its opening edge in sealing fashion.

As already indicated, the thickening can be formed before or during the melting of the bristles, and can also be formed accordingly by the contour of the opening edge of the guide channel. Thus, it is possible to, for example, design an opening with a larger diameter for the guide channel than is required for guiding the bristles, and to provide the thickening with a corresponding shoulder which is pulled into the sealing position in the expanded opening of the guide channel. Thus, in addition to a possible sealing of the thickening against the outer opening edge, additional sealing gaps are formed between the expanded opening and the molded shoulder. In this case the bristle holder has corresponding elevations on the bristle side in the finished product, from each of which a tuft of bristles projects.

According to another feature of the invention, the bristles can be introduced into the channel with a sleeve surrounding them and the thickening shaped against the end of the sleeve. In this design it is possible in particular to affect the contour at the back of the thickening that faces the wall of the mold. This embodiment also makes it possible to fit the sleeve tightly into the channel and to press the thickening in sealing fashion against the end of the sleeve by compressive or tensile forces. The seal therefore does not occur directly at the edge of the opening of the channel, but at the sleeve, whereby the latter together with the bristles is pulled back into a position flush with the wall of the mold. Instead, however, it is also possible to pull the sleeve back into the channel after the thickening is formed and to bring the thickening into its sealing position at the opening of the channel.

In another modification of the method, a plurality of bristles guided in adjacent channels can be shaped to form a cohesive thickening, wherein the individual thickenings are connected together by ribs or the like. However, sufficient throughput cross sections must be left for the material of the bristle holder.

In contrast to the known methods, the method according to the invention, in all the embodiments described, has the additional important advantage that the bonding length of the bristles is limited to the dimension required for their reliable anchoring, with the consequence that the bristle holder need only have the thickness required for its stability, and its thickness can therefore be relatively small. This is especially important in toothbrushes. In addition, the length of bristles required for bonding is limited to a minimum, so that the bristle material, which is generally more expensive, can be utilized most economically for its real purpose, namely, forming bristles.

The invention is described below with reference to device engineering embodiments which are shown in the drawings.

DETAILED DESCRIPTION

Figure 1:
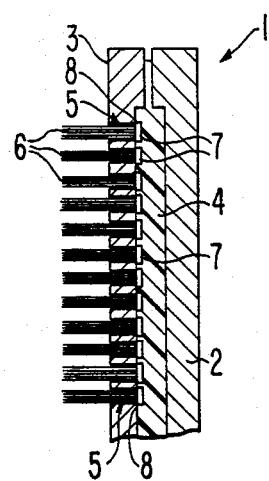
FIG. 1 is a section through an injection-molding or foaming mold after the hollow mold chamber has been filled.

In FIG. 1, a mold generally designated by the reference numeral 1, for example an injection mold, includes two parts 2 and 3 with the mold part 3 being fixed and the mold part 2 being displaceable with respect to mold part 3 for opening and closing the mold 1. The two mold parts 2 and 3 enclose a mold chamber 4 having a shape corresponding to the outside shape of a bristle holder. A plurality of guide channels 5, parallel in the illustrated embodiment are disposed on the part of mold 3 which is tensionable with a bristle strand 6 being guided in the guide 5 and having an end projecting into mold chamber 4. Bristle strands 6 can be fed as cut bristle tufts or as endless material from a roll (not shown).

Figure 3:
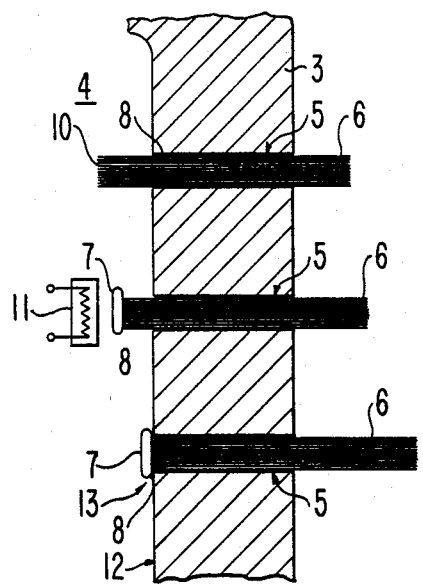
FIG. 3 is a schematic diagram showing the steps in the method.
Figure 4:
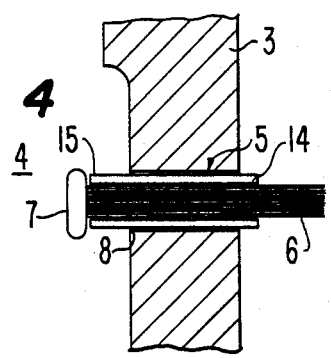
FIG. 4 is a section similar to FIG. 3 through another embodiment.
Figure 5:
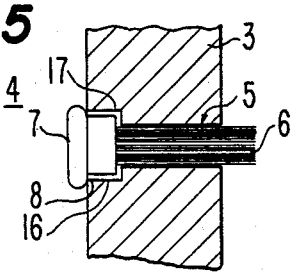
FIG. 5 is cross-sectional view of another modified embodiment of the present invention.

Before mold chamber 4 is filled with the bristle holder material, the ends of bristle strands 6 are melted so that a thickening 7, shown most clearly in FIGS. 3-5, is formed on each bristle strand 6. This can occur with mold 1 in an open or closed position. If the mold 1 is in a closed position, hot air for example can be blown into the mold 1 at a temperature which is sufficient to melt the ends of the bristles. When the mold 1 is opened, the necessary softening temperature can be applied with zero contact or by contact heat (FIG. 3). After or during the production of thickenings 7 the latter are brought into the sealing position at edges 8 of the guide channels 5. Between the mold wall of mold 3 in the vicinity of opening 8 of guide channels 7 and the back of thickenings 7 which face the wall, an undercut is provided. In closed mold 1 the material for the bristle holder is then introduced in liquid or plastic form or produced outside the mold 1, whereby the material penetrates the undercuts between thickening 7 and the mold wall of mold part 3.

Figure 2:
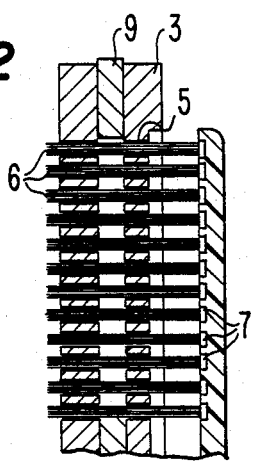
FIG. 2 is a section similar to FIG. 1 after the bristle holder has been removed from the mold.

After the bristle holder material hardens, the mold 1 is opened by pulling away mold part 2 as shown in FIG. 2 whereby the bristle strands 6 are pulled through guide channels 5 of fixed mold part 3. The bristles in the case of an endless material can then be cut to length by a knife 9 behind mold part 3. Bristle strands 6 are then pushed back into guide channels 5 until their ends are again in hollow mold 4.

In FIG. 3, the important method steps are shown enlarged. Bristle strand 6 is introduced into guide channel 5 of mold part 3 until its forward end 10 passes through opening 8 of guide channel 5 and projects into hollow mold chamber 4. In the second stage, end 10 of bristle strand 6 is melted to form a thickening 7, whereupon, in the embodiment shown, a heater 11 is provided which produces the necessary softening temperature either with zero contact or with contact heat. Thickening 7 thus formed is then brought in the third step into its sealing position at opening 8, for example, by pulling on bristle strand 6. In this way an undercut generally designated by the reference numeral 13 (FIG. 3) is formed between the back of thickening 7 and mold wall 12 of mold part 3, into which undercut the flowable material of the bristle holder can then penetrate.

In the embodiment according to FIG. 4, the bristle strand 6 is enclosed by a guide sleeve 14, whose exterior fits tightly in guide channel 5. Sleeve 14 has an end 15 which can be specially contoured against which thickening 7 is shaped. Before mold chamber 4 is filled or before plasticization of the material contained therein, bristle strand 6 and sleeve 14 are pulled back, whereupon thickening 7 again enters the sealing position at edge 8 of guide channel 5. Then the guide sleeve 14 can either be pulled further back than bristle strand 6 or brought into a position in which it is approximately flush with the opening 8 and seals it, so that the seal between thickening 7 and end 15 of sleeve 14 can again be restored between sleeve 14 and guide channel 5.

FIG. 5 shows an embodiment wherein the thickening 7 is contoured in a specific fashion during or after softening of the end of bristle strand 6. In this case, the thickening is provided with a cylindrical shoulder 16 which faces the bristle. Correspondingly, guide channel 5 is expanded to form a blind hole 17 in the vicinity of its opening 8, the inside diameter and depth of the hole corresponding to the shape of shoulder 16. The thickening 7 thus formed penetrates blind hole 17 after it is produced so that in addition to the sealing fit between thickening 7 and opening edge 8 a sealing gap is also provided between shoulder 16 and blind hole 17, which serves primarily to reduce pressure.

I claim:

1. Method for manufacturing products with bristles, the product including a bristle holder of a castable or foamable material and plastic bristles anchored therein, the method comprising the steps of inserting the bristles, either individually or as strands of bristles through channels into a mold for the bristle holder, melting the bristles by heat at an end in the mold to form a thickening, filling the mold with bristle holder material, and bringing the thickening on the bristles into sealing contact with an opening of the channel guiding the bristles by tensile forces applied to the bristles before the bristle holder material enters the mold thereby positively sealing the opening of the channel by the thickening at the end of the bristles.

2. Method according to claim 1, wherein the thickening is brought into a sealing position when the thickening is produced.

3. Method according to claim 1, wherein, after forming of the thickening, the bristles are pulled back into the guide channel.

4. Method according to claim 1, wherein, after forming of the thickening, a bristle guiding half of the mold is pushed against the thickening until the thickening abuts an opening of the guiding channel.

5. Method according to claim 1, wherein the thickening is shaped.

6. Method according to claim 1, wherein the thickening is so formed that an undercut is formed between the thickening and the wall of the mold that contains the opening of the channel.

7. Method according to claim 5, wherein the opening of a channel has a shape that conforms to the shape of the thickening.

8. Method according to claim 1, wherein the bristles are introduced into the channel with a sleeve surrounding them and the thickening is molded against an end of the sleeve.

9. Method according to claim 8, wherein the sleeve fits tightly in the channel and the thickening is pressed in a sealing fashion against the end of the sleeve.

10. Method according to claim 8 wherein the sleeve is pulled back into the channel after the thickening is molded and the thickening is brought into its sealing position at the opening in the channel.

11. Method according to claim 5, wherein a plurality of bristles guided in adjacent channels are shaped at their ends to form a cohesive thickening.

12. Method according to claim 1, wherein the bristles and bristle holders are made of different materials.

* * * * *